United States Patent
Solorzano

(10) Patent No.: US 11,343,982 B1
(45) Date of Patent: May 31, 2022

(54) WIRELESS CIRCUIT FOR ELECTRICAL IRRIGATION VALVE AND WIFI WIRELESS IRRIGATION SYSTEM

(71) Applicant: Omar Solorzano, Frisco, TX (US)

(72) Inventor: Omar Solorzano, Frisco, TX (US)

(*) Notice: Subject to any disclaimer, the term of this patent is extended or adjusted under 35 U.S.C. 154(b) by 0 days.

(21) Appl. No.: 17/465,608

(22) Filed: Sep. 2, 2021

Related U.S. Application Data

(60) Provisional application No. 63/076,518, filed on Sep. 10, 2020.

(51) Int. Cl.
| | |
|---|---|
| *A01G 25/16* | (2006.01) |
| *H04W 4/70* | (2018.01) |
| *G05B 15/02* | (2006.01) |
| *G06F 3/04883* | (2022.01) |
| *H04W 84/12* | (2009.01) |

(52) U.S. Cl.
CPC ............ *A01G 25/16* (2013.01); *G05B 15/02* (2013.01); *H04W 4/70* (2018.02); *G06F 3/04883* (2013.01); *H04W 84/12* (2013.01)

(58) Field of Classification Search
CPC ......... A01G 25/16; G05B 15/02; H04W 4/70; H04W 84/12; G06F 3/04883
See application file for complete search history.

(56) References Cited

U.S. PATENT DOCUMENTS

| | | | |
|---|---|---|---|
| 9,049,821 B1* | 6/2015 | Hanna ................... | A01G 25/165 |
| 2002/0085333 A1* | 7/2002 | Alexanian ............ | H01H 47/043 |
| | | | 361/189 |
| 2005/0171646 A1* | 8/2005 | Miller ................ | G05B 19/0426 |
| | | | 700/284 |
| 2013/0131874 A1* | 5/2013 | Shupe .................... | G05B 15/02 |
| | | | 700/284 |
| 2014/0039697 A1* | 2/2014 | Weiler .................... | A01G 25/16 |
| | | | 700/284 |
| 2015/0351335 A1* | 12/2015 | Abts ..................... | A01G 25/092 |
| | | | 239/728 |
| 2018/0014480 A1* | 1/2018 | Montgomery ........ | G05B 19/042 |
| 2018/0066764 A1* | 3/2018 | Duffin ................. | F16K 31/1266 |
| 2019/0141916 A1* | 5/2019 | Auguste ................. | A01G 25/06 |
| | | | 239/201 |

* cited by examiner

*Primary Examiner* — Ziaul Karim
(74) *Attorney, Agent, or Firm* — Plager Schack LLP; Mark H. Plager; Stephen Hallberg

(57) ABSTRACT

A wireless circuit for electrical irrigation valve and WiFi wireless irrigation system that does not use sprinkler controllers or timers is disclosed. The wireless circuit for electrical irrigation valve and WiFi wireless irrigation system is a purely wireless and includes a WiFi irrigation system controller that does not need to use copper wiring or any other wiring that can be damaged over time, nor does it need to use sprinkler controllers or timers. The wireless circuit for electrical irrigation valve and WiFi wireless irrigation system is a plug and play device operated through an application on a computer or other similar device that allows the end user to control all aspects of the irrigation system via the application. The wireless circuit for electrical irrigation valve and WiFi wireless irrigation system is also designed to be waterproof and weatherproof.

8 Claims, 5 Drawing Sheets

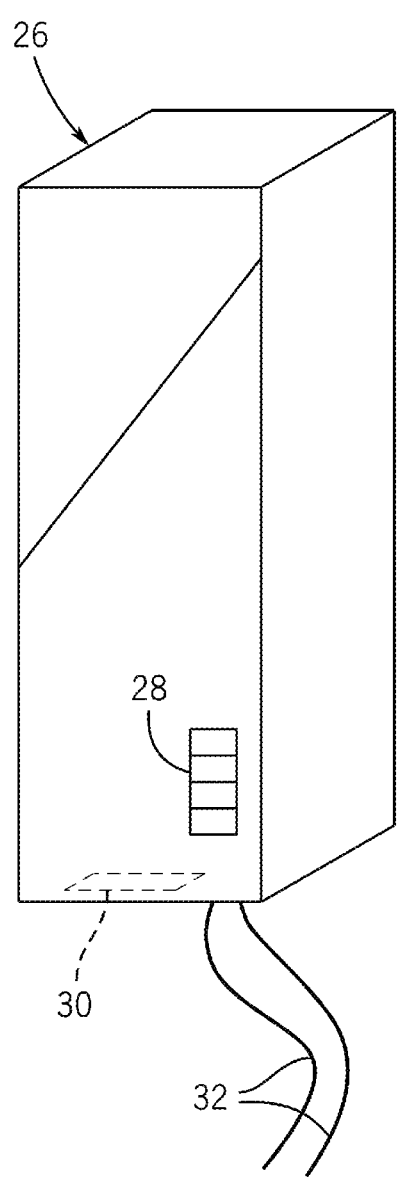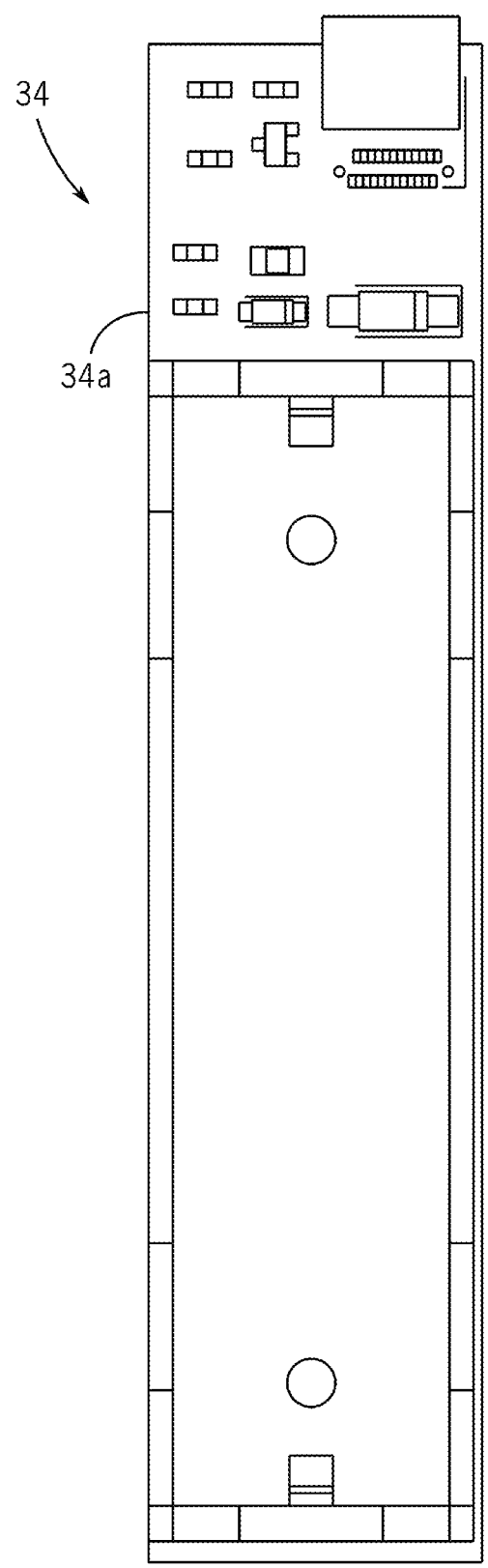
FIG. 2
FIG. 3

WIRELESS CIRCUIT FOR ELECTRICAL IRRIGATION VALVE AND WIFI WIRELESS IRRIGATION SYSTEM

CLAIM OF BENEFIT TO PRIOR APPLICATION

This application claims benefit to U.S. Provisional Patent Application 63/076,518, entitled "Wireless (Wifi) Circuit Prototype of Electrical Irrigation Valve," filed Sep. 10, 2020. The U.S. Provisional Patent Application 63/076,518 is incorporated herein by reference.

BACKGROUND

Embodiments of the invention described in this specification relate generally to irrigation systems, and more particularly, to wireless circuit for electrical irrigation valve and WiFi wireless irrigation system.

Traditional wired irrigation systems use copper wire and wired controllers in order to function. However, these traditional systems are easily damaged by end users, corroded, or burned up over time due to electrical surges and lightning strikes. These surges can cause shortages in wires and interfaces of irrigation systems and can burn up the copper wire and other components. Furthermore, components of wired irrigation systems are more easily damaged or corroded over time. Still further, the wires in traditional irrigation systems can be easily cut into by accident causing the need for costly repairs.

Traditional systems are more prone to damage and/or failure as they use more components that are exposed to the elements, surges, or even damage caused by end users or consumers and can be more bulky and costly to repair and install.

Therefore, what is needed is a way to make irrigation systems less prone to damage and failure by reducing the number of components exposed to exterior, outdoor weather conditions, power surges associated with electrical irrigation systems, and any other damage, whether accidental or intentional, that may occur to the connected irrigation systems.

The wireless circuit for electrical irrigation valve and WiFi wireless irrigation system of the present disclosure is a purely wireless and WiFi irrigation system controller that does not need to use copper wiring or any other wiring that can be damaged over time, nor does it need to use sprinkler controllers or timers. The wireless circuit for electrical irrigation valve and WiFi wireless irrigation system is a plug and play device operated through a software application on a computing device or other similar electronic system or mobile device that allows the end user to control all aspects of the irrigation system through the application. The wireless circuit for electrical irrigation valve and WiFi wireless irrigation system reduces the likelihood of having to pay for costly repairs regularly incurred with use of a wired irrigation system. Moreover, the wireless circuit for electrical irrigation valve and WiFi wireless irrigation system of the present disclosure uses less component parts than conventional wired irrigation systems and, therefore, requires less labor to install. In some embodiments, the wireless circuit for electrical irrigation valve and WiFi wireless irrigation system is designed to be waterproof and weatherproof.

BRIEF DESCRIPTION

Some embodiments of the invention include a novel wireless circuit for electrical irrigation valve in a WiFi wireless irrigation system is disclosed that is a purely wireless and WiFi irrigation system controller that does not need to use copper wiring or any other wiring that can be damaged over time, nor does it need to use sprinkler controllers or timers. In some embodiments, the wireless circuit for electrical irrigation valve and WiFi wireless irrigation system is a plug and play device operated through a software application that runs on a computing device and is configured to allow a user to control all aspects of the irrigation system through the application. Examples of computing devices on which the software application is supported include, without limitation, a traditional computing device, such as a desktop or laptop computer, a mobile device, such as a smartphone or a tablet computing device, or any other similar electronic system. The wireless circuit for electrical irrigation valve and WiFi wireless irrigation system of some embodiments reduces the likelihood of having to pay for costly repairs regularly incurred with use of a wired irrigation system. Moreover, the wireless circuit for electrical irrigation valve and WiFi wireless irrigation system of the present disclosure uses less component parts than conventional wired irrigation systems and, therefore, requires less labor to install. In some embodiments, the wireless circuit for electrical irrigation valve and WiFi wireless irrigation system is designed to be waterproof and weatherproof.

In some embodiments, the wireless circuit for electrical irrigation valve and WiFi wireless irrigation system comprises a wireless data communication module that controls the wireless circuit for the electrical irrigation valve and components of the WiFi wireless irrigation system. In some embodiments, the wireless data communication module comprises a WiFi chip. In some embodiments, the WiFi chip comprises an ESP-07 WiFi chip.

In some embodiments, a wireless irrigation solenoid controller of the WiFi wireless irrigation system is latched onto the solenoid that controls an irrigation pressurized valve that turns the irrigation system on and off. In some embodiments, an ESP-07 program of the ESP-07 WiFi chip is inside the wireless irrigation solenoid controller and is configured to access an application programmers' interface (API) using WiFi over the Internet. In some embodiments, the API includes data processing which is saved into on board memory of the WiFi wireless irrigation system. In some embodiments, the data received by the WiFi wireless irrigation system triggers the wireless circuit to turns the solenoid on and off.

The preceding Summary is intended to serve as a brief introduction to some embodiments of the invention. It is not meant to be an introduction or overview of all inventive subject matter disclosed in this specification. The Detailed Description that follows and the Drawings that are referred to in the Detailed Description will further describe the embodiments described in the Summary as well as other embodiments. Accordingly, to understand all the embodiments described by this document, a full review of the Summary, Detailed Description, and Drawings is needed. Moreover, the claimed subject matters are not to be limited by the illustrative details in the Summary, Detailed Description, and Drawings, but rather are to be defined by the appended claims, because the claimed subject matter can be embodied in other specific forms without departing from the spirit of the subject matter.

BRIEF DESCRIPTION OF THE DRAWINGS

Having described the invention in general terms, reference is now made to the accompanying drawings, which are not necessarily drawn to scale, and wherein:

FIG. 2 conceptually illustrates a perspective view of a waterproof case for the wireless circuit for electrical irrigation valve and WiFi wireless irrigation system in some embodiments.

FIG. 3 conceptually illustrates a mobile device that is used to interact with an application to configure and control the wireless circuit for electrical irrigation valve and WiFi wireless irrigation system in some embodiments.

DETAILED DESCRIPTION

Figure 1:
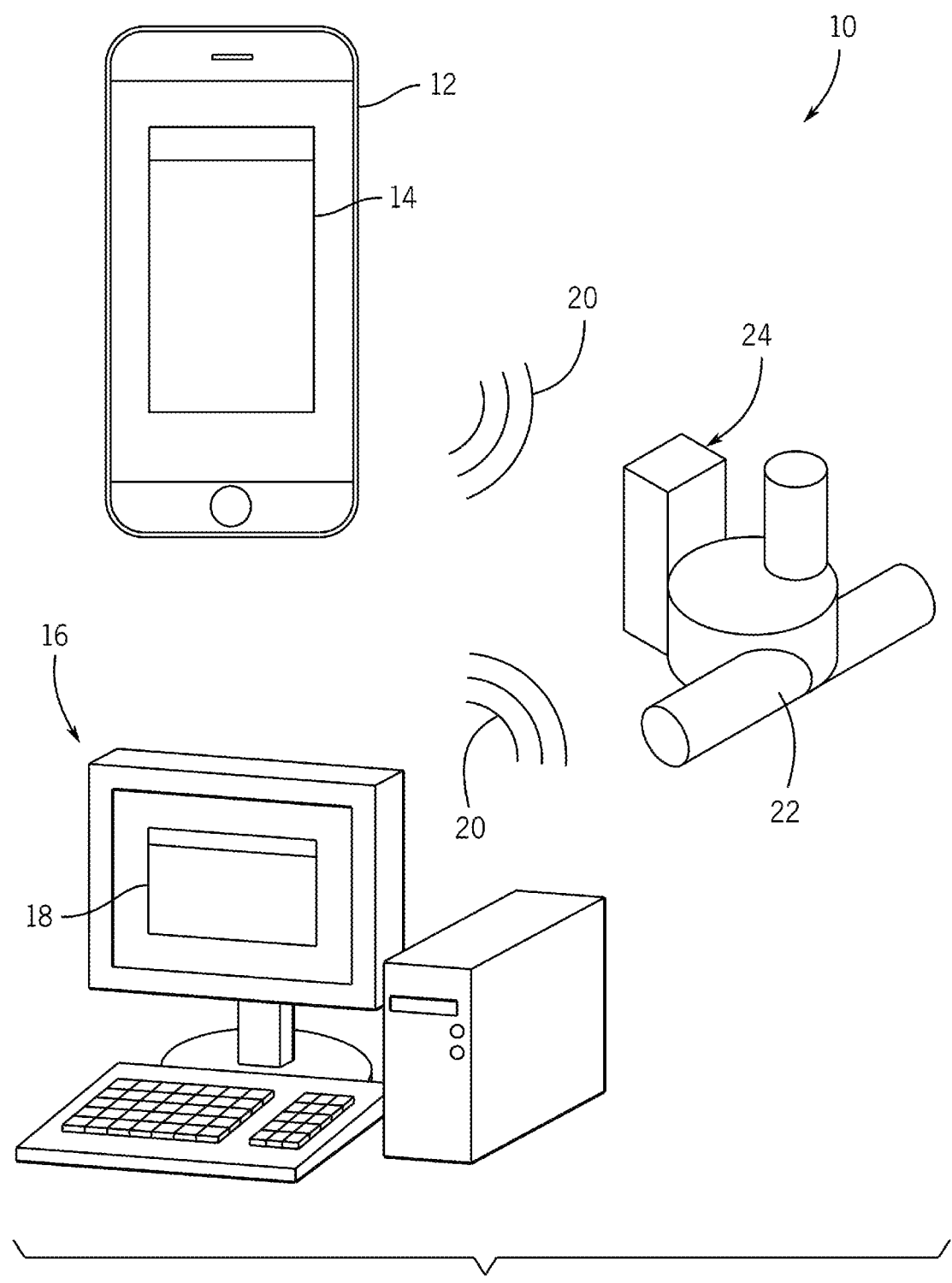
FIG. 1 conceptually illustrates a schematic diagram showing wireless communication between user's interfaces and the wireless circuit for electrical irrigation valve and WiFi wireless irrigation system in some embodiments.

In the following detailed description of the invention, numerous details, examples, and embodiments of the invention are described. However, it will be clear and apparent to one skilled in the art that the invention is not limited to the embodiments set forth and that the invention can be adapted for any of several applications.

Some embodiments of the invention include a novel wireless circuit for electrical irrigation valve in a WiFi wireless irrigation system is disclosed that is a purely wireless and WiFi irrigation system controller that does not need to use copper wiring or any other wiring that can be damaged over time, nor does it need to use sprinkler controllers or timers. In some embodiments, the wireless circuit for electrical irrigation valve and WiFi wireless irrigation system is a plug and play device operated through a software application that runs on a computing device and is configured to allow a user to control all aspects of the irrigation system through the application. Examples of computing devices on which the software application is supported include, without limitation, a traditional computing device, such as a desktop or laptop computer, a mobile device, such as a smartphone or a tablet computing device, or any other similar electronic system. The wireless circuit for electrical irrigation valve and WiFi wireless irrigation system of some embodiments reduces the likelihood of having to pay for costly repairs regularly incurred with use of a wired irrigation system. Moreover, the wireless circuit for electrical irrigation valve and WiFi wireless irrigation system of the present disclosure uses less component parts than conventional wired irrigation systems and, therefore, requires less labor to install. In some embodiments, the wireless circuit for electrical irrigation valve and WiFi wireless irrigation system is designed to be waterproof and weatherproof.

In some embodiments, the wireless circuit for electrical irrigation valve and WiFi wireless irrigation system comprises a wireless data communication module that controls the wireless circuit for the electrical irrigation valve and components of the WiFi wireless irrigation system. In some embodiments, the wireless data communication module comprises a WiFi chip. In some embodiments, the WiFi chip comprises an ESP-07 WiFi chip.

In some embodiments, a wireless irrigation solenoid controller of the WiFi wireless irrigation system is latched onto the solenoid that controls an irrigation pressurized valve that turns the irrigation system on and off. In some embodiments, an ESP-07 program of the ESP-07 WiFi chip is inside the wireless irrigation solenoid controller and is configured to access an application programmers' interface (API) using WiFi over the Internet. In some embodiments, the API includes data processing which is saved into on board memory of the WiFi wireless irrigation system. In some embodiments, the data received by the WiFi wireless irrigation system triggers the wireless circuit to turns the solenoid on and off.

As stated above, traditional wired irrigation systems use copper wire and wired controllers in order to function. However, these traditional systems are easily damaged by end users, corroded, or burned up over time due to electrical surges and lightning strikes. These surges can cause shortages in wires and interfaces of irrigation systems and can burn up the copper wire and other components. Furthermore, components of wired irrigation systems are more easily damaged or corroded over time. Still further, the wires in traditional irrigation systems can be easily cut into by accident causing the need for costly repairs. Also, traditional systems are more prone to damage and/or failure as they use more components that are exposed to the elements, surges, or even damage caused by end users or consumers and can be more bulky and costly to repair and install. Embodiments of the wireless circuit for electrical irrigation valve and WiFi wireless irrigation system described in this specification solve such problems by a wireless WiFi circuit prototype used in irrigation systems that eliminates the need for copper wires and therefore, allows less chance for failure in the system. The wireless circuit for electrical irrigation valve and WiFi wireless irrigation system also eliminates the need for bulky controllers or timers as it is completely operated by a computer software application that is operated wirelessly and transmits commands wirelessly from the computing device on which the software is running to the wireless circuit for electrical irrigation valve and WiFi wireless irrigation system. In this way, the wireless circuit for electrical irrigation valve and WiFi wireless irrigation system saves consumers money and cuts down on the average cost of installation of the irrigation system.

Embodiments of the wireless circuit for electrical irrigation valve and WiFi wireless irrigation system described in this specification differ from and improve upon currently existing options. In particular, some embodiments differ from what currently exists on the market, in that, the wireless circuit for electrical irrigation valve and WiFi wireless irrigation system is completely wireless and connects to the consumer's in-home WiFi so that the consumer can control the entire system by the click of a button on their smart phone or computer. The wireless circuit for electrical irrigation valve and WiFi wireless irrigation system of the present disclosure operates more efficiently than existing conventional wired systems by cutting down on the need for copper wires all together which allows less chance for failure in the system.

In addition, some embodiments of the wireless circuit for electrical irrigation valve and WiFi wireless irrigation system improve upon the currently existing options by eliminating the risk of power surges which, in traditional electrical systems, can cause shortages in wires and interfaces of conventional wired irrigation systems. These surges can burn up the copper wire and other components. Furthermore, components of the conventional wired irrigation systems are more easily damaged or corroded over periods of time. Wires can be easily cut into by accident causing the need for costly repairs over time. By contrast, the wireless circuit for electrical irrigation valve and WiFi wireless irrigation system described in this specification is a purely wireless and does not need to use copper wiring or any other wiring that can be damaged over time, nor does it need to use sprinkler controllers or timers. Furthermore, in some embodiments, the wireless circuit for electrical irrigation valve and WiFi wireless irrigation system is centralized in a plug-and-play device operated through an application on a computer or other similar device that allows the end user to control all aspects of the irrigation system via the application. As a result, the wireless circuit for electrical irrigation valve and WiFi wireless irrigation system will save consumers money by drastically reducing the potential for costly repairs regularly incurred with use of a wired irrigation system. Moreover, the wireless circuit for electrical irrigation valve and WiFi wireless irrigation system cuts down on the average cost of installation of the irrigation system as it uses less component parts and, therefore, requires less labor to install. To make it even more durable, the wireless circuit for electrical irrigation valve and WiFi wireless irrigation system of some embodiments is designed to be waterproof and weatherproof.

By way of example, FIG. 1 conceptually illustrates a schematic diagram showing wireless communication between user's interfaces and the wireless circuit for electrical irrigation valve and WiFi wireless irrigation system 10 in some embodiments. As shown in this figure, the schematic diagram showing wireless communication between users interfaces and the wireless circuit for electrical irrigation valve and WiFi wireless irrigation system 10 includes a mobile computing device 12, a mobile app 14 that runs on the mobile computing device 12 to configure and control the wireless circuit for electrical irrigation valve and WiFi wireless irrigation system, a traditional desktop computer system 16, a software application 18 that runs on the traditional desktop computer system 16, wireless signals 20, a solenoid 22, and a wireless circuit 24.

Turning to another example, FIG. 2 conceptually illustrates a perspective view of a waterproof case 26 for the wireless circuit for electrical irrigation valve and WiFi wireless irrigation system in some embodiments. As shown in this figure, the waterproof case 26 includes a charge status LED 28, a charging port 30, and DC solenoid valve connection wires 32.

Now referring to another example, FIG. 3 conceptually illustrates a printed circuit board (PCB) 34 with motherboard 34*a* of the wireless circuit 24 device that is used to connect by a device of the user and interact with an application to configure and control the wireless circuit for electrical irrigation valve and WiFi wireless irrigation system in some embodiments.

The wireless circuit for electrical irrigation valve and WiFi wireless irrigation system of the present disclosure may be comprised of the following elements. This list of possible constituent elements is intended to be exemplary only and it is not intended that this list be used to limit the wireless circuit for electrical irrigation valve and WiFi wireless irrigation system of the present application to just these elements. Persons having ordinary skill in the art relevant to the present disclosure may understand there to be equivalent elements that may be substituted within the present disclosure without changing the essential function or operation of the wireless circuit for electrical irrigation valve and WiFi wireless irrigation system.

Figure 4:
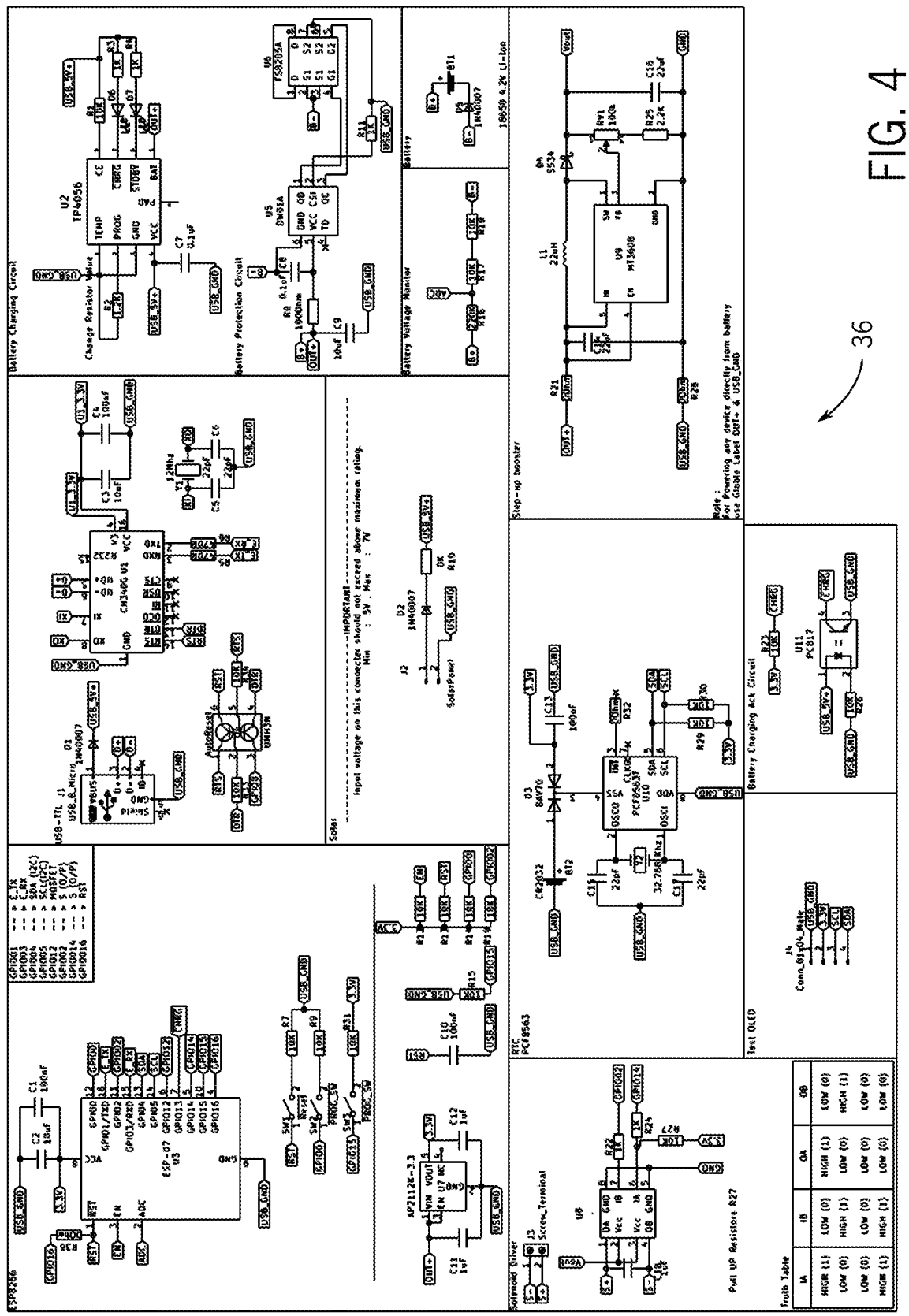
FIG. 4 conceptually illustrates an electrical schematic for the wireless circuit for electrical irrigation valve and WiFi wireless irrigation system in some embodiments.

By way of example, FIG. 4 conceptually illustrates an electrical schematic 36 for the wireless circuit for electrical irrigation valve and WiFi wireless irrigation system in some embodiments. This electrical schematic 36 for the wireless circuit is an ESP8266, which is a PCB for a standard (or "full") size wireless circuit for electrical irrigation valve and WiFi wireless irrigation system. The standard size ESP8266 includes several components including the main chip responsible for processing runtime instructions of the ESP-07 program, a USB type "C" charge port/receptacle, a solar connector, battery charging circuits, an organic light emitting diode (OLED) test circuit, solenoid driver circuit, step up booster circuit, etc. The following list of components are demonstrated in the standard ("full") size wireless circuit for electrical irrigation valve and WiFi wireless irrigation system.

1. C1: 100 nF, C_402_1005 Metric
2. C4: 100 nF, C_402_1005 Metric
3. C7: 100 nF, C_402_1005 Metric
4. C8: 100 nF, C_402_1005 Metric
5. C10: 100 nF, C_402_1005 Metric
6. C13: 100 nF, C_402_1005 Metric
7. C11: 1 uF, C_402_1005 Metric
8. C12: 1 uF, C_402_1005 Metric
9. C5: 22 pF, C_0603_1608 Metric_Pad1.05×0.95 mm_H
10. C6: 22 pF, C_0603_1608 Metric_Pad1.05×0.95 mm_H
11. C15: 22 pF, C_0603_1608 Metric_Pad1.05×0.95 mm_H
12. C17: 22 pF, C_0603_1608 Metric_Pad 1.05×0.095 mm_H
13. C2: 10 uF, C_0603_1608 Metric_Pad1.05×0.95 mm_H
14. C3: 10 uF, C_0603_1608 Metric_Pad1.05×0.95 mm_H
15. C9: 10 uF, C_0603_1608 Metric_Pad1.05×0.95 mm_H
16. C18: 1 uF, C_0603_1608 Metric_Pad1.05×0.95 mm_H
17. C14: 22 uF, C_0805_2012 Metric
18. C16: 22 uF, C_0805_2012 Metric
19. R32: 0 Ohm, R_0402_1005 Metric
20. R36: 0 Ohm, R_0402_1005 Metric
21. R1: 10 k, R_0603_1608 Metric_Pad1.05×0.95 mm_H
22. R7: 10 k, R_0603_1608 Metric_Pad1.05×0.95 mm_H
23. R9: 10 k, R_0603_1608 Metric_Pad1.05×0.95 mm_H
24. R12: 10 k, R_0603_1608 Metric_Pad1.05×0.95 mm_H
25. R13: 10 k, R_0603_1608 Metric_Pad1.05×0.95 mm_H
26. R14: 10 k, R_0603_1608 Metric_Pad1.05×0.95 mm_H
27. R15: 10 k, R_0603_1608 Metric_Pad1.05×0.95 mm_H
28. R18: 10 k, R_0603_1608 Metric_Pad1.05×0.95 mm_H
29. R19: 10 k, R_0603_1608 Metric_Pad1.05×0.95 mm_H
30. R23: 10 k, R_0603_1608 Metric_Pad1.05×0.95 mm_H
31. R26: 10 k, R_0603_1608 Metric_Pad1.05×0.95 mm_H
32. R3: 1K, R_0603_1608 Metric_Pad1.05×0.95 mm_H
33. R4: 1K, R_0603_1608 Metric_Pad1.05×0.95 mm_H
34. R11: 1K, R_0603_1608 Metric_Pad1.05×0.95 mm_H
35. R22: 1K, R_0603_1608 Metric_Pad1.05×0.95 mm_H
36. R24: 1K, R_0603_1608 Metric_Pad1.05×0.95 mm_H
37. R10: 0 Ohm, R_0603_1608 Metric_Pad1.05×0.95 mm_H 38. R21: 0 Ohm, R_0603_1608 Metric_Pad1.05×0.95 mm_H
39. R28: 0 Ohm, R_0603_1608 Metric_Pad1.05×0.95 mm_H
40. R5: 470R, R_0603_1608 Metric_Pad1.05×0.95 mm_H
41. R6: 470R, R_0603_1608 Metric_Pad1.05×0.95 mm_H
42. R8: 100 Ohm, R_0603_1608 Metric_Pad1.05×0.95 mm_H
43. R25: 2.2K, R_0603_1608 Metric_Pad1.05×0.95 mm_H
44. R2: 1.2K, R_0805_2012 Metric_Pad1.15×1.40 mm_Ha
45. R16: 220K, R_1206_3216 Metric_Pad1.42×1.75 mm_H
46. L1: 22uH, L_10.4×10.4_H4.8
47. D4: SS34, D_SMA_Handsoldering
48. D1: 1N40007, D_SOD-123F
49. D2: 1N40007, D_SOD-123F
50. D5: 1N40007, D_SOD-123F
51. D6: LED, LED_0603_1608Metric_Castellated
52. D7: LED, LED_0603_1608Metric_Castellated
53. D3: BAV70, SOT-23
54. U11: PC817, DIP-4_W7.62 mm
55. U3: ESP-07, ESP-07
56. U2: TP4056, HSOP-8-1EP_3.9×4.9 mm_P1.27 mm_EP2. 41
57. U1: CH340G, SOIC-16_3.9×9.9 mm_P1.27 mm
58. U10: PCF8563T, SOIC-8_3.9×4.9 mm_P1.27 mm
59. U8: SOP-8_3.76×4.96 mm_P1.27 mm
60. U7: AP2112K-3.3, SOT-23-5
61. U5: DW01A, SOT-23-6_Handsoldering
62. U9: MT3608, SOT-23-6_Handsoldering
63. U4: UMH3N, SOT-363_SC-70-6_Handsoldering
64. U6: FS8205A, TSSOP-8_4.4×3 mm_P0.65 mm
65. Y2: 32.768 Khz, Crystal_SMD_3215-2Pin_3.2×1.5 mm
66. Y1: 12 MHz, Crystal_SMD_HC49-SD
67. SW2: ~PROG_SW, 1TS002G23003500CT
68. SW3: ~PROG_SW, 1TS002G23003500C
69. SW1: ~Reset, C_Rect_L7.5 mm_W6.5 mm_P5.00 mm
70. BT2: CR2032, BatteryHolder_Keystone_1060_1×2032
71. BT1: 18650 4.2V Li-ion, BatteryHolder_MPD_BH-18650-PC2
72. RV1: 100 k, Potentiometer_Vishay_T73YP_Vertical
73. J3: Screw Terminal, HB9500_2P
74. J2: Solar Panel, JWT_A3963_1×02_P3.96 mm_Vertical
75. J4: Conn_01×04_Male, PinHeader_1×04_P2.54 mm_Vertical
76. J1: USB_B_Micro, USB_Micro-B_Molex-105017-0001

The wireless circuit for electrical irrigation valve and WiFi wireless irrigation system of the present disclosure generally works by the wireless irrigation solenoid controller, which is latched on the solenoid that controls an irrigation pressurized valve that turns a conventional wired irrigation system on and off. In some embodiments, the ESP-07 program for the ESP-07 WiFi chip inside the wireless irrigation solenoid controller can access the API using WiFi over the Internet. The API includes data which is processed and saved into on board memory and as per data received from servers this device turns solenoids on and off.

To make the wireless circuit for electrical irrigation valve and WiFi wireless irrigation system of the present disclosure, a person may follow the design schematic for the prototype for the wireless circuit, which is demonstrated, for example, by the electrical schematic 36 of FIG. 4. Then the person would build a printed circuit board (PCB) and motherboard or otherwise obtain such a PCB with motherboard. After completing these two steps, the brain of the wireless circuit, namely, the ESP-07 WiFi chip, would need to be assembled. Then the person would solder the TP4056, DW01A with MOSFETs for battery charging, overcharge, and discharge protection. Finally, the person would use an MT3608 for boosting battery voltage to drive solenoids using H-bridge L9110S.

Figure 5:
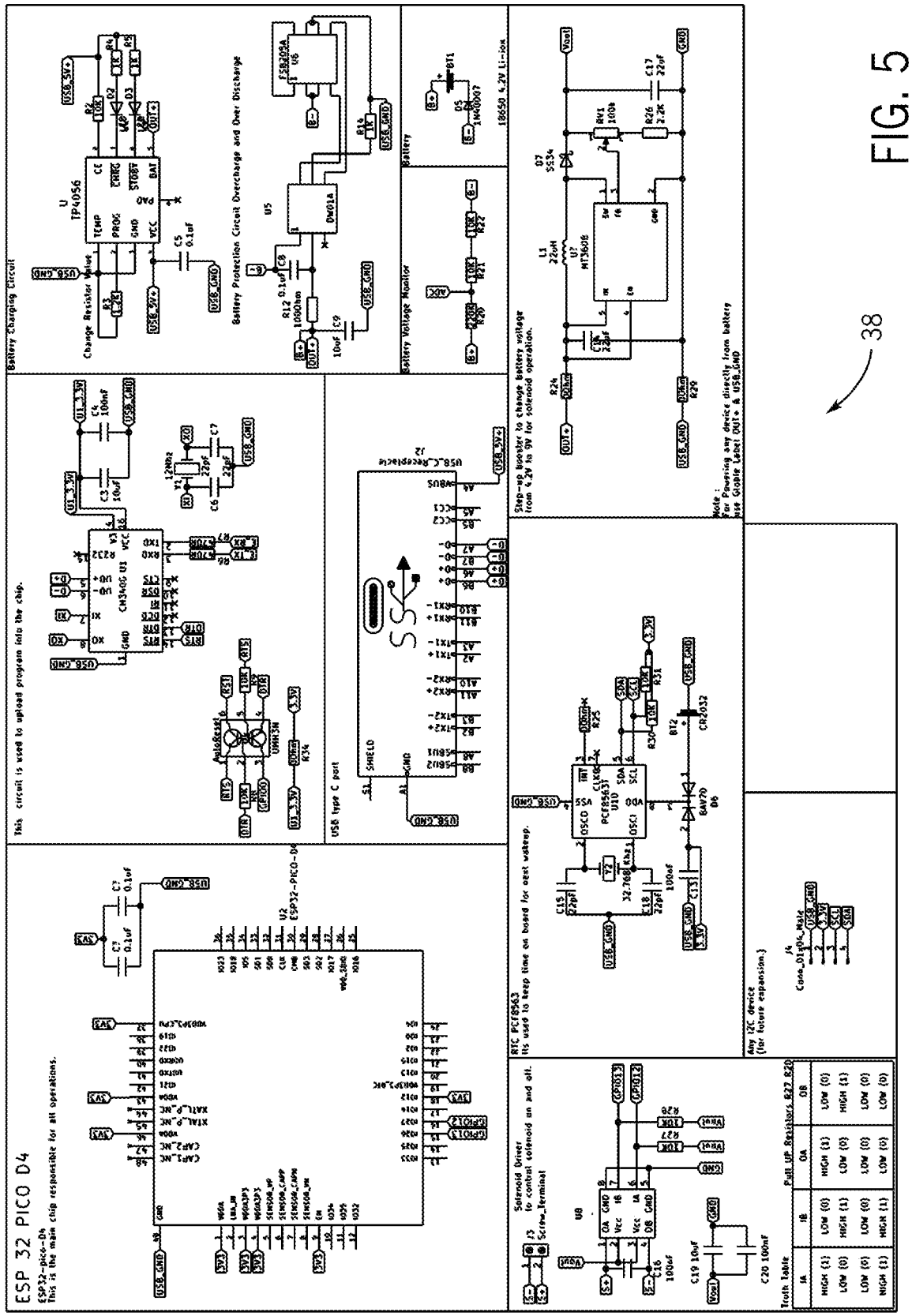
FIG. 5 conceptually illustrates another electrical schematic for the wireless circuit for electrical irrigation valve and WiFi wireless irrigation system in some embodiments.

By way of example, FIG. 5 conceptually illustrates another electrical schematic 38 for the wireless circuit for electrical irrigation valve and WiFi wireless irrigation system in some embodiments. This electrical schematic 38 for the wireless circuit is an ESP 32 PICO D4, which is a PCB for small form factor version of the wireless circuit for electrical irrigation valve and WiFi wireless irrigation system. The small form factor ESP 32 PICO D4 includes several components including the main chip responsible for the processing operations of the ESP-07 WiFi program. Also included are a circuit to upload the ESP-07 WiFi program into the ESP-07 WiFi chip, a battery charging circuit, a USB type "C" charge port, and a solenoid driver circuit, among other components for battery charging, battery charge level monitoring, and other components. The following list of components are demonstrated in the small form factor ESP 32 PICO D4 version of the wireless circuit for electrical irrigation valve and WiFi wireless irrigation system.

1. C4, C5, C8, C13, C16, C20: 100 nF, C_0402_1005Metric
2. C6, C7, C15, C18:22 pF, C_0603_1608Metric_Pad1.05×0.95m_HandSolder
3. C3, C9, C19: 10 uF, C_0603_1608Metric_Pad1.05×0.95 mm_HandSolder
4. C14, C17: 22 uF, C_0805_2012Metric
5. R25: 0(zero) Ohm, R_0402_1005Metric
6. R2, R8, R9, R21, R22, R27, R28, R30, R31: 10K, R_0603_1608Metric_Pad1.05×0.95 mm_HandSolder
7. R4, R5, R14: 1K, R_0603_1608Metric_Pad1.05×0.95 mm_HandSolder
8. R24, R29, R34: 0(zero) Ohm, R_0603_1608Metric_Pad1.05×0.95 mm_HandSolder
9. R6, R7: 470R, R_0603_1608Metric_Pad1.05×0.95 mm_HandSolder
10. R12: 100 Ohm, R_0603_1608Metric_Pad1.05×0.95 mm_HandSolder
11. R26: 2.2K, R_0603_1608Metric_Pad1.05×0.95 mm_HandSolder
12. R3: 1.2K, R_0805_2012Metric_Pad1.15×1.40 mm_HandSolder
13. R20: 220K, R_1206_3216Metric_Pad1.42×1.75 mm_HandSolder
14. L1: 22 uH, L_10.4×10.4_H4.8
15. D7: SS34, D_SMA_Handsoldering
16. D1, D5: 1N40007, D_SOD-123F
17. D2, D3: LED, LED_0603_1608Metric_Castellated
18. D6: BAV70, SOT-23
19. U2: ESP32-PICO-D4, PQFN50P700X700X104-49N
20. U1: CH340G, SOIC-16_3.9×9.9 mm_P1.27 mm
21. U10: PCF8563T, SOIC-8_3.9×4.9 mm_P1.27 mm
22. U8: LM3881, SOP-8_3.76×4.96 mm_P1.27 mm
23. U4: UMH3N, SOT-363_SC-70-6_Handsoldering 24. Y2: 32.768 Khz, Crystal_SMD_3215-2Pin_3.2×1.5 mm 25. Y1: 12 Mhz, Crystal_SMD_HC49-SD 26. BT2: CR2032, BatteryHolder_Keystone_1060_1×2032

27. BT1: 18650 4.2V Li-ion, BatteryHolder_MPD_BH-18650-PC2

28. RV1: 100 k, Potentiometer_Vishay_T73YP_Vertical

29. J4: Conn_01×04_Male, PinHeader_1×04_P2.54 mm_Vertical

30. J2: USB_C_Receptacle, USB_C_Receptacle_Amphenol_12401610E4-2A

To use the wireless circuit for electrical irrigation valve and WiFi wireless irrigation system of the present disclosure, a person can install the wireless circuit with the ESP-07 WiFi chip (or other suitable wireless data communication device) in the irrigation valve of a residential or commercial irrigation system, either in ground or above ground. The wireless circuit for electrical irrigation valve and WiFi wireless irrigation system is designed to be weather and waterproof. The end user can then access the wireless circuit through the computer application downloaded on their computer, internet device, or cell phone. This application then allows the end user to adjust and control their irrigation system through a few clicks of a button. By utilizing this wireless circuit for electrical irrigation valve and WiFi wireless irrigation system, the customer avoids the need to use copper wiring or bulky controllers. The wireless circuit for electrical irrigation valve and WiFi wireless irrigation system also eliminates common problems encountered when using copper wires, such as corrosion or shortages. Further, the wireless circuit for electrical irrigation valve and WiFi wireless irrigation system drastically reduces the overall costs related to necessary parts used within the irrigation system and the overall installation of the irrigation system.

Additionally, the wireless circuit for electrical irrigation valve and WiFi wireless irrigation system of the present disclosure can be adapted for use in any field of technology that uses a WiFi circuit to control the input and output of an electrical system or that involves the use of solenoids and relays.

Many of the above-described features and applications are implemented as software processes, such as the ESP-07 WiFi program and the software application or mobile app that runs on the user's computing device or mobile device to wirelessly connect with the wireless circuit for electrical irrigation valve and WiFi wireless irrigation system to configure and control operation of the wireless circuit for electrical irrigation valve and WiFi wireless irrigation system, where such software-implemented processes are specified as a set of instructions recorded on a computer readable storage medium (also referred to as computer readable medium or machine readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory, such as the ESP-07 WiFi program, which is uploaded to the wireless circuit and is therefore an embedded program to run on the main processing chip of the wireless circuit for electrical irrigation valve and WiFi wireless irrigation system, or applications stored in magnetic storage or other device storage, such as the software application on the user's computing device or mobile device, which can be read into memory of the device for processing by a processor of the device. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs, such as the specific machine implementation of the ESP-07 WiFi program that enables the electrical irrigation valve of the irrigation system to communicate wirelessly (via WiFi), providing for an improved irrigation system sans hardwired connections of traditional irrigation systems, namely, the wireless circuit for electrical irrigation valve and WiFi wireless irrigation system.

Figure 6:
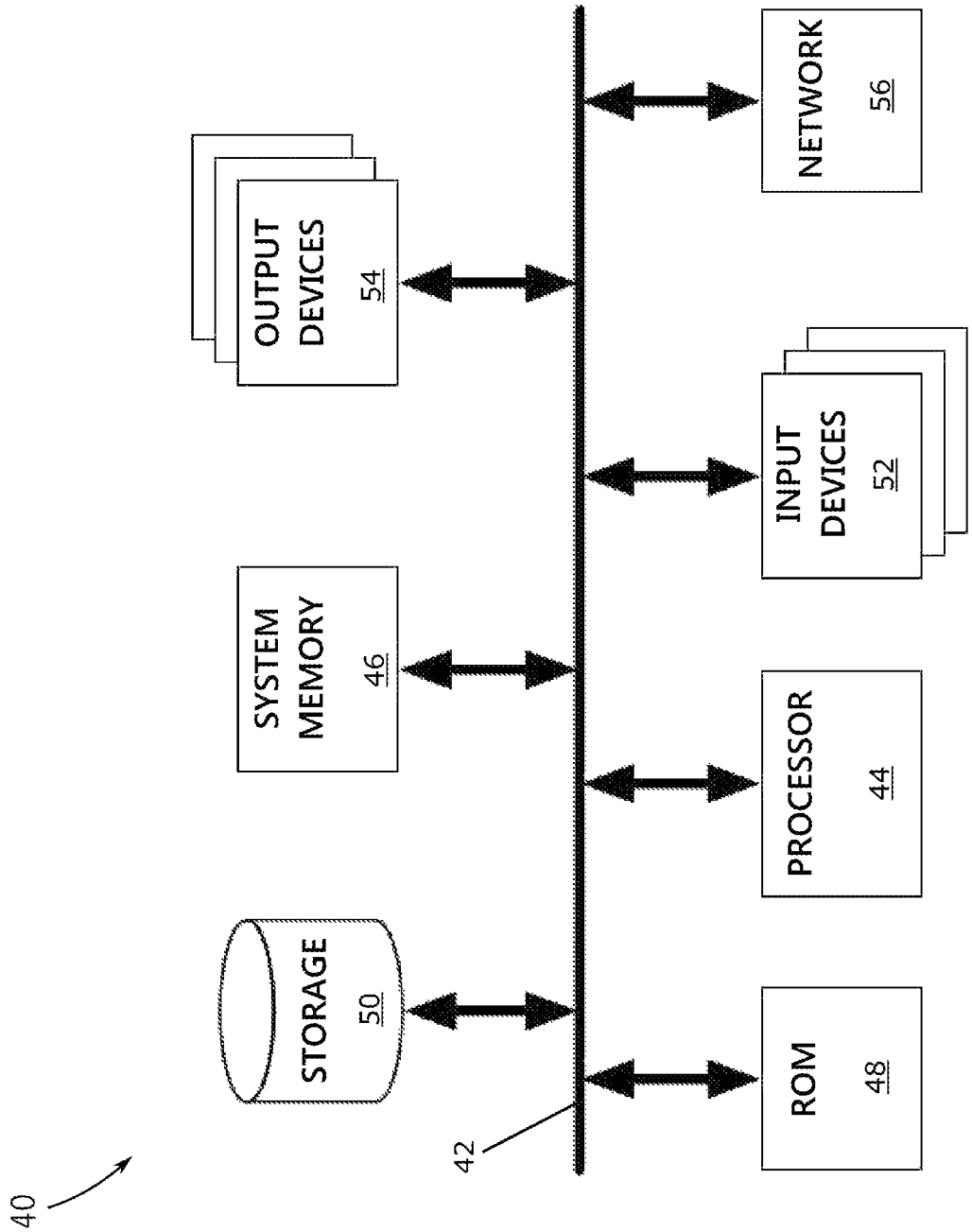
FIG. 6 conceptually illustrates an electronic system with which some embodiments of the invention are implemented.

By way of example, and without limitation, FIG. 6 conceptually illustrates an electronic system 40 with which some embodiments of the invention are implemented. The electronic system 40 may be a computing device (e.g., a standard desktop computer, a laptop computer, a single board computing device, or any other traditional computing device), a mobile device (e.g., a cell phone, a smartphone, a tablet computing device, a digital mobile app processing device, or any other sort of mobile device), an embedded printed circuit board (PCB) with motherboard and memory storing an embedded program, such as the ESP-07 WiFi program, or any other sort of electronic device. Such an electronic system includes various types of computer readable media and interfaces for various other types of computer readable media. Electronic system 40 includes a bus 42, processing unit(s) 44, a system memory 46, a read-only memory 48, a permanent storage device 50, input devices 52, output devices 54, and a network 56.

The bus 42 collectively represents all system, peripheral, and chipset buses that communicatively connect the numerous internal devices of the electronic system 40. For instance, the bus 42 communicatively connects the processing unit(s) 44 with the read-only memory 48, the system memory 46, and the permanent storage device 50.

From these various memory units, the processing unit(s) 44 retrieves instructions to execute and data to process in order to execute the processes of the invention. The processing unit(s) may be a single processor or a multi-core processor in different embodiments.

The read-only-memory (ROM) 48 stores static data and instructions that are needed by the processing unit(s) 44 and other modules of the electronic system. The permanent storage device 50, on the other hand, is a read-and-write memory device. This device is a non-volatile memory unit that stores instructions and data even when the electronic system 40 is off. Some embodiments of the invention use a mass-storage device (such as a magnetic or optical disk and its corresponding disk drive) as the permanent storage device 50.

Other embodiments use a removable storage device (such as a floppy disk or a flash drive) as the permanent storage device 50. Like the permanent storage device 50, the system memory 46 is a read-and-write memory device. However, unlike storage device 50, the system memory 46 is a volatile read-and-write memory, such as a random access memory. The system memory 46 stores some of the instructions and data that the processor needs at runtime. In some embodiments, the invention's processes are stored in the system memory 46, the permanent storage device 50, and/or the read-only memory 48. For example, the various memory units include instructions for processing appearance alterations of displayable characters in accordance with some embodiments. From these various memory units, the processing unit(s) 44 retrieves instructions to execute and data to process in order to execute the processes of some embodiments.

The bus 42 also connects to the input and output devices 52 and 54. The input devices enable the user to communicate information and select commands to the electronic system. The input devices 52 include alphanumeric keyboards and pointing or cursor control devices. The output devices 54 display images generated by the electronic system 40. The output devices 54 include printers and display devices, such as liquid crystal displays (LCD) or organic light emitting diode (OLED) displays. Some embodiments include a touchscreen that functions as both an input and output device.

Finally, as shown in FIG. 6, bus 42 also couples electronic system 40 to a network 56 through a network adapter (not shown). The network adapter may be any sort of network adapter, such as an Ethernet adapter or a wireless WiFi adapter. In this manner, the computer can be a part of a network of computers (such as a local area network ("LAN"), a wide area network ("WAN"), or an Intranet), or a network of networks (such as the Internet). Any or all components of electronic system 40 may be used in conjunction with the invention.

These functions described above can be implemented in digital electronic circuitry, in computer software, firmware or hardware. The techniques can be implemented using one or more computer program products. Programmable processors and computers can be packaged or included in mobile devices. The processes and logic flows may be performed by one or more programmable processors and by sets of programmable logic circuitry. General and special purpose computing and storage devices can be interconnected through communication networks.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

The above-described embodiments of the invention are presented for purposes of illustration and not of limitation. While these embodiments of the invention have been described with reference to numerous specific details, one of ordinary skill in the art will recognize that the invention can be embodied in other specific forms without departing from the spirit of the invention. Thus, one of ordinary skill in the art would understand that the invention is not to be limited by the foregoing illustrative details, but rather is to be defined by the appended claims.

I claim:

1. A wireless irrigation system comprising:
   a local wireless network router that supports WiFi data communication between connected devices;
   an irrigation solenoid controller of an electrical irrigation valve of an irrigation system, wherein the irrigation solenoid controller is configured to turn a solenoid on and off by toggling between an on state and an off state;
   a wireless circuit that is applied to the electrical irrigation valve of the irrigation system and enables the irrigation system to connect to the local wireless network router as a WiFi wireless irrigation system and control irrigation via an application programming interface (API) that provides irrigation operation and control commands from devices connected over WiFi, wherein the irrigation operation and control commands toggle the solenoid between the on state and the off state, wherein the wireless circuit comprises a USB type-C charge port receptacle, battery charging circuits, and an organic light emitting diode (OLED) test circuit;
   a battery to electrically power the wireless circuit and the electrical irrigation valve of the WiFi wireless irrigation system;
   a waterproof case for the wireless circuit comprising a charge status LED, a charging port, and DC solenoid valve connection wires;
   an embedded WiFi wireless circuit control program that is unloaded to the wireless circuit and is configured to run as an embedded wireless circuit control program when launched upon the wireless circuit and the electrical irrigation valve of the WiFi wireless irrigation system being powered electrically via the battery, wherein the wireless circuit control program comprises an ESP-07 WiFi program that is configured to execute as an embedded process on a main processing chip of the wireless circuit;
   a computing device comprising a processor that executes machine code instructions of applications launched on the computing device, a system memory module that persistently stores data for the computing device, random access memory (RAM) module that loads data from the system memory and machine code instructions associated with launched applications into one or more memory registers and buffers for runtime operation and access, and a WiFi module that is configured to enable WiFi connection to the local wireless network router; and
   a software application that is installed on the computing device, stored in the system memory module, and configured for operation and control of the WiFi wireless irrigation system by a user interacting with the software application by operation of the computing device when the computing device is wirelessly connected to the local wireless network router and in WiFi connection with the WiFi wireless irrigation system.

2. The wireless irrigation system of claim 1, wherein the wireless circuit comprises a wireless data communication module that controls WiFi communication between the wireless circuit and the local wireless network router.

3. The wireless irrigation system of claim 2, wherein the wireless data communication module comprises a WiFi chip.

4. The wireless irrigation system of claim 3, wherein the WiFi chip comprises an ESP-07 WiFi chip.

5. The wireless irrigation system of claim 1, wherein the computing device comprises a mobile computing device.

6. The wireless irrigation system of claim 5, wherein the mobile computing device comprises one of a smartphone and a tablet computing device.

7. The wireless irrigation system of claim 5, wherein the software application comprises a mobile app configured for operation and control of the WiFi wireless irrigation system by the user interacting with the mobile app by touch gesture input and command operation from the user to a touchscreen interface of the mobile computing device.

8. The wireless irrigation system of claim 1, wherein the API comprises data that is processed and saved onto a board memory of the main processing chip of the wireless circuit.

* * * * *